United States Patent
Madhav et al.

(10) Patent No.: US 9,838,643 B1
(45) Date of Patent: Dec. 5, 2017

(54) METHOD AND SYSTEM FOR DETECTION OF INHERENT NOISE PRESENT WITHIN A VIDEO SOURCE PRIOR TO DIGITAL VIDEO COMPRESSION

(71) Applicant: Interra Systems, Inc., Cupertino, CA (US)

(72) Inventors: Advait Mogre Madhav, Sunnyvale, CA (US); Bhupender Kumar, Palwal (IN); Pervez Alam, Dwarka (IN); Rishi Gupta, Noida (IN); Shekhar Madnani, Noida (IN)

(73) Assignee: Interra Systems, Inc., Cupertino, CA (US)

( * ) Notice: Subject to any disclaimer, the term of this patent is extended or adjusted under 35 U.S.C. 154(b) by 0 days.

(21) Appl. No.: 15/229,006

(22) Filed: Aug. 4, 2016

(51) Int. Cl.
*G06K 9/48* (2006.01)
*H04N 5/911* (2006.01)
*G06T 7/00* (2017.01)
*G06T 7/60* (2017.01)

(52) U.S. Cl.
CPC .......... *H04N 5/911* (2013.01); *G06T 7/0002* (2013.01); *G06T 7/0085* (2013.01); *G06T 7/60* (2013.01); *G06T 2207/20021* (2013.01); *G06T 2207/20182* (2013.01)

(58) Field of Classification Search
CPC ...... H04N 19/117; H04N 1/58; H04N 5/3675; H04N 1/4097
USPC ....... 382/190, 199, 260, 266, 274, 275, 282; 358/3.26, 3.27, 537, 538, 463
See application file for complete search history.

(56) References Cited

U.S. PATENT DOCUMENTS

| 7,373,014 | B1* | 5/2008 | Mancuso | H04N 19/86 375/E7.19 |
| 7,778,480 | B2* | 8/2010 | Huang | G06T 5/002 358/426.01 |
| 8,000,500 | B2* | 8/2011 | Park | G06K 9/00335 382/107 |
| 8,019,164 | B2* | 9/2011 | Taguchi | G06K 9/685 382/141 |
| 8,064,718 | B2* | 11/2011 | Pedersen | G06T 5/002 382/268 |
| 8,072,511 | B2* | 12/2011 | Masaoka | H04N 5/232 348/241 |
| 8,208,171 | B2* | 6/2012 | Kubo | H04N 1/4097 358/1.9 |

\* cited by examiner

*Primary Examiner* — Yosef Kassa
(74) *Attorney, Agent, or Firm* — Next IP Law Group (57) ABSTRACT

A method and system detection of inherent noise present within a video source prior to digital video compression is disclosed. A noise image is extracted by subtracting a current image from its filtered version. Each pixel of the extracted noise image is normalized based on a determined principal edge image and the analog noise pixels are accumulated to generate an intermediate noise confidence value. Analog noise may be detected based on an analog noise confidence value generated based on the intermediate noise confidence value and a ringing metric, a blockiness metric, a motion vector cost of the current image, a blurriness exception weight, a flashiness exception weight, and a pan blur exception weight. The method may further comprise detection of high frequency noise based on determining a high frequency noise confidence value that may be based on a high frequency noise value and a frequency component with highest magnitude.

6 Claims, 6 Drawing Sheets

METHOD AND SYSTEM FOR DETECTION OF INHERENT NOISE PRESENT WITHIN A VIDEO SOURCE PRIOR TO DIGITAL VIDEO COMPRESSION

CROSS-REFERENCE TO RELATED APPLICATIONS/INCORPORATION BY REFERENCE

This application is also related to issued application U.S. Pat. No. 9,232,118 to Interra Systems, entitled "Methods and Systems for Detecting Video Artifacts", the entire disclosure of which are incorporated herein by reference.

This application is also related to pending application U.S. application Ser. No. 15/075,079 to Interra Systems, entitled "Method and System for detection of blur artefact in digital video due to high quantization", the entire disclosure of which are incorporated herein by reference.

This application is also related to by Qadri. M. T., Tan. K. T. & Ghanbari M, "Frequency Domain Blockiness and Blurriness Meter for Image Quality Assessment", International Journal of Image Processing (IJIP), Volume (5): Issue (3): 2011, the disclosure of which are incorporated herein by reference.

FIELD OF THE DISCLOSURE

The present disclosure is generally related to detection of artefacts in a video and more particularly, to detection of inherent noise present in a video. More specifically, the present disclosure is related to detection of inherent noise present within a video prior to video compression, wherein such noise may be attributed to a form of analog noise, such as Gaussian or Shot noise or, high frequency (HF) noise due to an imperfect chroma sub-carrier rejection in the original baseband analog TV content.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Recent advancements in the field of video processing have led to development of various algorithms for detection of artefacts in a video. Such techniques for detection of artefacts may be based on a spatial domain analysis or a frequency domain analysis. Further, the artefacts may be attributed to digitisation and/or various types of lossy compression techniques applied on the image for compression, wherein data is quantized and/or discarded. The artefacts may correspond to analog noise, a high frequency noise, ringing, blockiness, and/or the like. The ringing artefacts may result in an appearance of spurious objects near the edges of one or more objects present in the image. The blockiness artefacts may be caused by use of block-based transforms for compression. Such block-based transforms may result in pixilation (macro blocking) in the image when the bit rate is low.

In one of the existing techniques for detection of video noise, one or more speckles that correspond to the image are detected in a radiological image. The noise signal magnitude is determined for the radiological image. Further, the speckle is reported as noise based on the determined noise signal magnitude. In accordance with another technique, a blur in a digital image is determined based on the edges in the image and the spectral energy of the input image. In accordance with another technique, a noise is removed from a Color Filter Array (CFA) based on an application of noise removal techniques classified pixels of an image. The classified pixel may correspond to edge pixels and non-edge pixels. In accordance with another technique, an artefact such as a dead pixel is detected based on a local mean value, local standard difference, a global mean value, a global standard difference are determined for a pixel of interest and a plurality of pixels neighboring the pixel of interest. Further, the aforementioned metric are compared with one or more thresholds to ascertain whether the pixel of interest corresponds to a dead pixel or not.

Evidently, the existing techniques of detection of video artefact detection are either based on a spatial domain analysis or a frequency domain analysis of the image corresponding to a video. Therefore, such techniques are not robust enough as they do not exhaustively explore the combination of spatial as well as temporal artefact detection steps. In order to render high quality media content, it is imperative to minimise the video artefacts. This in turn, requires robust detection of the various types of compression artefacts and their cause, so as to modify the parameters that lead to video artefact minimisation.

BRIEF SUMMARY

It will be understood that this disclosure in not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only, and is not intended to limit the scope of the present disclosure.

In an example embodiment, a method for detection of analog noise or non-localized noise and high frequency noise in a video is provided. The video may comprise one or more images. The method comprises extraction of a noise image by subtraction of a current image from a filtered current image. The method further comprises determination of a maximum pixel value from the noise image. The method further comprises determination of a normalized noise image by normalization of all the pixels present in the noise image. The normalization may be performed with respect to the maximum pixel value. The method may further comprise extraction of an edge image by extraction of gradients of the filtered current image. A maximum gradient magnitude is determined for each row of the edge image.

The method further comprises determination of a principal edge image containing gradients for each row that are greater than a predefined percentage of the maximum gradient magnitude for that row. Further, a boundary neighbourhood image is generated using the principal edge image. A raw noise image may be determined using the principal edge image, boundary neighbourhood image and the normalized noise image. For generation of raw noise image, pixels of the normalized noise image corresponding to which the gradients are present in the PE image and the boundary neighbourhood image are excluded from the normalized noise image. The method further comprises determination of an analog noise value by determination of an aggregate of all the pixel values corresponding to the pixels present in the raw noise image. The pixel values of such pixels are below an analog noise threshold. Further, the method comprises normalizing the aggregate by the size of the raw noise image.

The method further comprises determination of an intermediate noise confidence value based on the analog noise value. The method further comprises detection of analog noise based on determination of an analog noise confidence value. The analog noise confidence value may be based on at least the intermediate noise confidence value, a ringing metric, a blockiness metric, a motion vector cost of the current image, blurriness exception weight, a flashiness exception weight, and a pan blur exception weight.

In another example embodiment, a method for detection of high frequency (HF) noise in a video comprising one or more images is provided. The method comprises determination of a filtered current image based on application of median filtering on the current image. The method may further comprise extraction of an edge image based on extraction of gradients of the filtered current image and determination of a grid periodicity and an offset in horizontal and vertical direction for the edge image. The method further comprises determination of a gradient angle image using gradient sign for each pixel of the edge image. The method further comprises determination of a raw noise angle image based on utilization of the gradient angle image and boundary neighbourhood image determined to preclude genuine video information content boundaries and their near neighbourhoods during the process of high frequency (HF) noise analysis. The method may further comprise determination of one or more frequency components of the raw noise angle image by performing a two-dimensional Fast Fourier Transform (2D-FFT) of the raw noise angle image. The method may further comprise normalization of the frequency components of the transformed noise angle image based on the frequency component whose magnitude is the highest ("max_bin"). The normalized frequency components of the transformed noise angle image are scaled by a predefined constant.

The method may further comprise determination of a high frequency (HF) noise value by aggregating the frequency components that are above a high frequency noise threshold and below the predefined constant. Further, the aggregated frequency components are outside of a block grid based on the grid periodicity and the offset in horizontal and vertical direction for the edge image, and within first and second harmonic of a grid pattern. The method may further comprise detection of high frequency noise based on determining a high frequency noise confidence value. The high frequency noise confidence value may be based on the high frequency noise value, and the frequency component with the highest magnitude.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred, systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
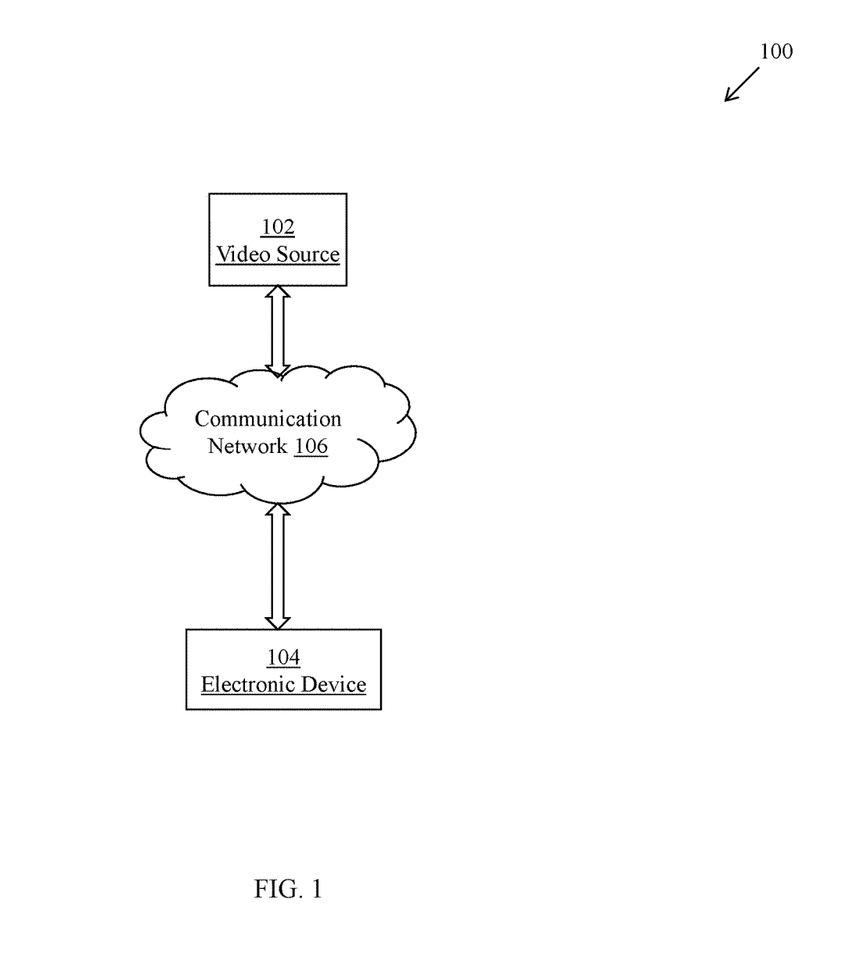
FIG. 1 illustrates a block diagram of a network environment for detection of artefacts comprising analog noise and high frequency noise in a video, according to an embodiment.

FIG. 1 illustrates a block diagram of a network environment for detection of analog noise in a video, according to an embodiment. According to an embodiment, video signals may be transmitted from one of the one or more heterogeneous video source 102 that may correspond to a video database, a content server, cloud storage, and/or any other storage means connected to an electronic device 104. In an example embodiment, the video source 102 may be located at a remote location with respect to the electronic device 104. In another example embodiment, the video source 102 may be integrated with the electronic device 104. The electronic device 104 may be connected to the video source 102 by means of a communication network 106, such as a local area network, internet, and/or the like. The electronic device 104 may be operable to receive video that comprise one or more images, from the video source 102 according to the methods described herein. In an aspect, the electronic device 104 may correspond to a television (TV), laptop, desktop, smartphone, or any other apparatus having at least a memory means and a processor. The electronic device 104 may comprise a processor that may be configured to decode the received video content and determine one or more artefacts associated with the video content received from the video source 102. In certain aspects, the video may be stored in a memory means of the electronic device 104 and no external source may be required.

In an example embodiment, the video source 102 may store the video content captured by recording device, such as a camera. The stored video content may be encoded based on one or more encoding schemes. In an example embodiment, the stored video may be encoded and/or compressed based on a quantization parameter (QP) used. In an instance, when the value of the QP is high, one or more compression artefacts may be visible in the video content when it is rendered on a device, such as the electronic device 104. Such compression artefacts may comprise ringing, blurriness, and/or blockiness artefacts. Similarly, in another instance, the other artefacts caused by parameters pertaining the capturing device used for capturing the videos, such as motion associated with the capturing device, illumination used by the capturing device, zoom settings of the capturing device, and/or the like. Further, the analog noise artefact may be introduced during capture or the ingesting of old movie content. The HF noise may be introduced in scenarios when a chroma sub-carrier leaks into a Y-channel due to inadequate suppression. The aforementioned artefacts may be visible in the rendered video rendered on the electronic device 104.

In an aspect, the electronic device 104 may receive one or more user inputs from a user (not shown). The received one or more user inputs may correspond to a request to render the video content on a display screen of the electronic device 104. Based on the received one or more user inputs, the electronic device 104 may retrieve the video content from the video source 102, via the communication network 106.

In an aspect, the electronic device 104 may pre-process one or more current images of the received video content. The pre-processing may be based on application of a noise reduction technique such as median filtering, and the like, on one or more current images of the received video content. Based on the aforementioned filtering of a current image of the one or more current images of the received video, the electronic device 104 may obtain a filtered current image. The electronic device 104 may further extract a noise image by subtracting a current image from a filtered current image. The electronic device 104 may determine a maximum pixel value from the extracted noise image. In an aspect, the electronic device 104 may determine a normalized noise image by normalizing all the pixels present in the noise image with respect to the determined maximum pixel value.

In an aspect, the electronic device 104 may perform edge detection on a filtered current image of the one or more filtered current images to generate an edge image. The edge detection may comprise extraction of gradients of the filtered current image. The extraction of the gradients of the filtered current image may comprise processing the filtered current image by a plurality of gradient filter masks. In an example embodiment, the extraction of the gradients of the filtered current image may be based on one or more techniques known in the art, such as a first order differential of the image, a Sobel Filter based technique for edge detection, Canny edge detection, or the like.

In an aspect, the electronic device 104 may process the edge image in a row-by-row pattern. For each row of the edge image, the electronic device 104 may determine a maximum gradient magnitude. The electronic device 104 may determine a principal gradient threshold that may be a predefined percentage of the maximum gradient magnitude determined for a row of the edge image. The electronic device 104 may further compare the gradient values in a row with the determined principal gradient threshold. Based on the comparison, the electronic device 104 may remove the gradient values that are less than the determined principal gradient threshold for the row. Further, the electronic device 104 may retain the gradient values of a row that are greater than the determined principal gradient threshold. The edge image determined based on the aforementioned dynamic thresholding and comparison corresponds to a Principal Edge (PE) image. The gradient values in the PE image may correspond to a set of gradients.

In an aspect, the electronic device 104 may determine a boundary neighbourhood image based on the PE image. In an aspect, the electronic device 104 may determine a raw noise image by using the PE image, the boundary neighbourhood image, and the normalized noise image. The determination of the raw noise image may be based on exclusion of pixels of the normalized noise image corresponding to which the gradients are present in the PE image and the boundary neighbourhood image. In other words, the excluded gradients correspond to principal gradient and one or more gradients in the vicinity of the principal gradients of the PE image.

In an aspect, the electronic device 104 may determine an analog noise value by determining an aggregate of all the pixel values corresponding to the pixels present in the raw noise image. Such pixels in the raw noise image may be lesser than an analog noise threshold. The electronic device 104 may further normalize the determined aggregate based on the size of the raw noise image.

In an aspect, the electronic device 104 may determine an intermediate noise confidence value based on the analog noise value. The electronic device 104 may further determine the analog noise based on the determination of an analog noise confidence value. The determined analog noise confidence value may be based on at least the intermediate noise confidence value, a ringing metric, a blockiness metric, a motion vector cost of the current image, blurriness exception weight, a flashiness exception weight, and a pan blur exception weight, or a combination thereof. In an example embodiment, the blurriness exception weight may correspond to a metric that is based on the blurriness and pan blur associated with a video. In such a case, pan blur exception weight may not be required as a separate metric.

In an aspect, the electronic device 104 may determine a filtered current image based on application of median filtering on the current image. The electronic device 104 may further extract an edge image based on extraction of gradients of the filtered current image and determination of a grid periodicity and an offset in horizontal and vertical direction for the edge image. In an aspect, using the edge image, the electronic device 104 may determine the gradients for generation of the gradient magnitude image. Further, the electronic device 104 may determine a direction of the extracted gradients using the filtered current image. The electronic device 104 may determine a gradient angle image based on the determined directions of the extracted gradients.

In an example embodiment, the electronic device 104 may further utilise the PE image and the boundary neighbourhood image determined in the case of analog noise calculation. Based on gradient angle image and the boundary neighbourhood image, the electronic device 104 may determine a raw noise angle image. The electronic device 104 may further perform 2-dimensional Fast Fourier Transform (2D-FFT) of the determined raw noise angle image to generate transformed noise angle image. Such a 2D-FFT may be performed in order to determine one or more frequency components of the raw noise angle image. The electronic device 104 may further normalize the frequency components of the transformed noise angle image based on the frequency component whose magnitude is the highest. The electronic device 104 may further scale the normalized frequency components of the transformed noise image based on a predefined constant.

In an aspect, the electronic device 104 may determine a grid periodicity and an offset in horizontal and vertical direction for the gradient magnitude image. Such a determined grid periodicity and the offset may correspond to the blockiness artefacts present in the one or more images of the current image of the received video.

In an aspect, the electronic device 104 may determine a high frequency noise value by aggregation of the scaled frequency components that are above a high frequency noise threshold and below a predefined constant. Further, the determination of the high frequency noise value may be based on scaled frequency components that are outside a block grid based on the determined grid periodicity and the offset in horizontal and vertical direction for filtered current image. Additionally, the determination of the high frequency noise value may be further based on high frequency components that are within first and second harmonic of a grid pattern.

In an aspect, the electronic device 104 may detect high frequency noise by determining a high frequency noise confidence value. Such a high frequency noise confidence value may be determined based on the frequency component with the highest magnitude and the high frequency noise value.

A person of ordinary skill in the art will appreciate that the determined analog noise confidence and the high frequency noise confidence may be used either in conjunction or independently, to process the received video in order to remove various kinds of spatio-temporal artefacts present in the video.

Figure 2:
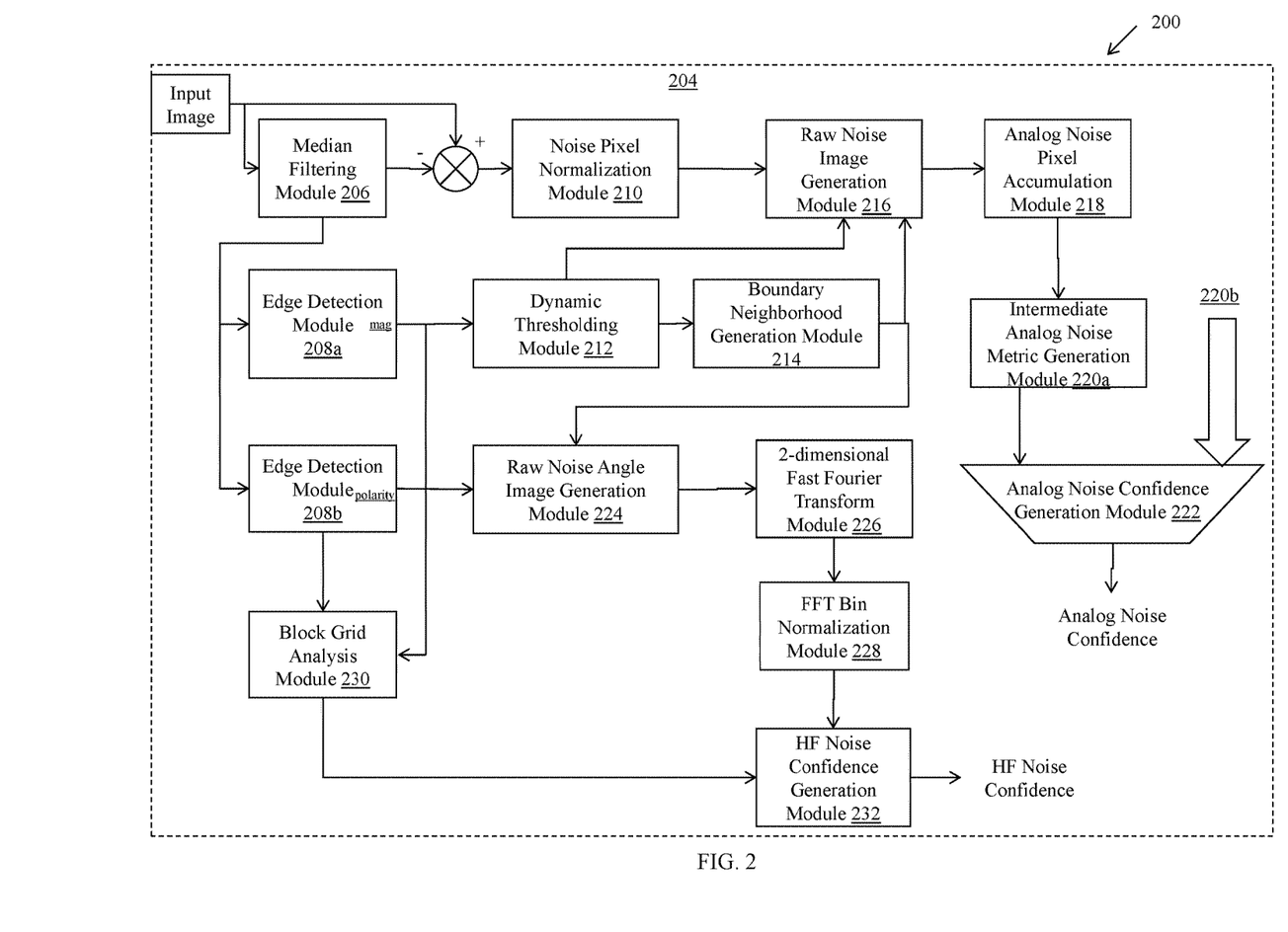
FIG. 2 illustrates a block diagram of a system for detection of artefacts comprising analog noise and high frequency noise in a video, according to an embodiment.

FIG. 2 illustrates a block diagram of a system for detection of artefacts comprising analog noise and high frequency noise in a video, according to an embodiment. With reference to the region diagram 200, there are shown one or more units of the electronic device 104. FIG. 2 is explained in conjunction with the elements disclosed in FIG. 1. In an implementation, the electronic device 104 may correspond to a laptop, desktop, smartphone, or any other apparatus having at least a central processing unit (CPU) 202 (not shown) and a memory means 204 (not shown). The received video from the video source 102 may be stored in the memory 204 of the electronic device 104 and no external source may be required.

The CPU 202 executes computer program instructions stored in the memory 204. The CPU 202 may also be configured to decode and execute any instructions received from the video source 102 through the communication network 106. The CPU 202 may also execute one or more client applications. The CPU 202 may include one or more general purpose processors (e.g., INTEL microprocessors) and/or one or more special purpose processors (e.g., digital signal processors). The CPU 202 may be configured to execute computer-readable program instructions, such as program instructions to carry out any of the functions described in this description.

The memory 204 includes a computer readable medium including volatile and/or non-volatile storage components, such as optical, magnetic, organic or other memory or disc storage, which may be integrated in whole or in part with a processor, such as CPU 202. Alternatively, the memory may be remotely located and coupled to the CPU 202 by connection mechanism and/or network cable. The memory 204 is enabled to store various types of data. For instance, the memory 204 may store a set of predefined constants related to the electronic device 104 and computer-readable program instructions executable by the CPU 202. In an aspect, the memory 204 may store the video that needs to be analyzed. The memory 204 also includes one or more programming modules that comprise one or more instructions executable by the CPU 202. In an embodiment, for determination of analog noise, the memory 204 may comprise one or more modules, such as a median filtering module 206, an edge detection module 208*a*, a noise image pixel normalization module 210, a dynamic thresholding module 212, a boundary neighbourhood generation module 214, a raw noise image generation module 216, an analog noise pixel accumulation module 218, an intermediate analog noise metric generation module 220*a*, an analog noise confidence generation module 222. In an embodiment, for determination of High Frequency noise, the memory 204 may comprise an edge detection module 208*b*, a raw noise angle image generation module 224, a 2-dimensional Fast Fourier Transform (2D-FFT) module 226, an FFT bin normalization module 228, a block grid analysis module 230, and/or a high frequency noise confidence generation module 232.

A person of ordinary skill in the art will appreciate that each of the modules of the diagram 200 may comprise one or more instruction sets that may be stored in the memory 204 associated with the electronic device 104. The foregoing one or more stored modules may be controlled by the CPU 202 to perform the steps to implement the method to detect artefacts in a video content.

In operation, the CPU 202 of the electronic device 104 may receive one or more user inputs from a user to render the video content. Based on the received one or more user inputs the CPU 202 may be configured to retrieve the video content from the video source 102, via the communication network 106. The received video content may comprise one or more artefacts caused by the digital encoding of the content by one or more recording devices present at the video source 102. Such one or more compression artefacts may correspond to analog noise, a high frequency noise, a blurriness, a blockiness, ringing artefacts, and the like. The received video content may comprise one or more input images. The one or more input images of the received video content may be processed by the CPU 202 based on the steps disclosed in the subsequent disclosure.

In an aspect, the CPU 202 may be configured to pre-process one or more current images of the received video content based on execution of one or more instructions of the median filtering module 206. The one or more instructions of the median filtering module 206 may comprise pre-processing one or more current images of the received video content by application of a noise reduction technique such as median filtering, and the like. Based on the aforementioned filtering of a current image of the one or more current images of the received video, the CPU 202 may be configured to obtain a filtered current image.

In an aspect, the CPU 202 may be configured to extract a noise image by subtracting a current image from a filtered current image. The CPU 202 may be further configured to determine a maximum pixel value from the extracted noise image. In an aspect, the CPU 202 may be configured to determine a normalized noise image by normalizing all the pixels present in the noise image with respect to the determined maximum pixel value. Such a normalized noise image may be determined by the CPU 202 based on execution of one or more instructions of the noise image pixel normalization module 210.

In an aspect, the CPU 202 may be further configured to perform edge detection on a filtered current image of the one or more filtered current images to generate an edge image. Such a detection of the edges may be based on execution of one or more instructions of the edge detection module 208a. The edge detection may comprise extraction of gradients of the filtered current image. The extraction of the gradients of the filtered current image may comprise processing the filtered current image by a plurality of gradient filter masks. In an example embodiment, the extraction of the gradients of the filtered current image may be based on one or more techniques known in the art, such as a first order differential of the image, a Sobel Filter based technique for edge detection, Canny edge detection, or the like.

In an aspect, the CPU 202 may be configured to process the edge image in a row-by-row pattern. For each row of the edge image, the CPU 202 may be configured to determine a maximum gradient magnitude. The CPU 202 may be further configured to determine a principal gradient threshold that may be a predefined percentage of the maximum gradient magnitude determined for a row of the edge image. The CPU 202 may be configured to compare the gradient values in a row with the determined principal gradient threshold. Based on the comparison, the CPU 202 may be configured to remove the gradient values that are less than the determined principal gradient threshold for the row. Further, the CPU 202 may be configured to retain the gradient values of a row that are greater than the determined principal gradient threshold. The edge image determined based on the aforementioned dynamic thresholding and comparison corresponds to a Principal Edge (PE) image. In an example embodiment, the aforementioned determination of the PE image may be performed by the CPU 202 based on the execution of one or more instructions of the dynamic thresholding module 212.

In an aspect, the electronic device 104 may determine a boundary neighbourhood image based on the PE image. Such a boundary neighbourhood image may be determined based on execution of one or more instructions of the boundary neighbourhood image generation module 214 by the CPU 202. In an aspect, the CPU 202 may be configured to determine a raw noise image by using the PE image, the boundary neighbourhood image, and the normalized noise image. The determination of the raw noise image may be based execution of one or more instructions of the raw noise image generation module 216, by the CPU 202. In an aspect, the determination of the raw noise image may be further based on the exclusion of pixels of the normalized noise image corresponding to which the gradients are present in the PE image and the boundary neighbourhood image. In other words, the excluded gradients correspond to principal gradient and one or more gradients in the vicinity of the principal gradients of the PE image.

In an aspect, the CPU 202 may be configured to determine an analog noise value by determining an aggregate of all the pixel values corresponding to the pixels present in the raw noise image. Such pixels in the raw noise image may be lesser than an analog noise threshold. The CPU 202 may be further configured to normalize the determined aggregate based on the size of the raw noise image. In an aspect, the determination of the analog noise value may be based on the execution of one or more instructions of the analog noise pixel accumulation module 218, by the CPU 202.

In an aspect, the CPU 202 may be configured to determine an intermediate noise confidence value based on the analog noise value. In an aspect, the determination of the intermediate noise confidence value may be based on the execution of one or more instructions of the intermediate analog noise metric generation module 220a, by the CPU 202. The CPU 202 may be further configured to determine the analog noise based on the determination of an analog noise confidence value. In an aspect, the determination of the analog noise confidence value may be based on the execution of one or more instructions of the analog noise confidence generation module 222, by the CPU 202. In an aspect, the determined analog noise confidence value may be based on at least the intermediate noise confidence value, a ringing metric, a blockiness metric, a motion vector cost of the current image, blurriness exception weight, a flashiness exception weight, and a pan blur exception weight, or a combination thereof. In an example embodiment, the aforementioned parameters for determining analog noise confidence may be obtained from respective modules (not shown) or common module 220b that may provide such parameters. In an example embodiment, the blurriness exception weight may correspond to a metric that is based on the blurriness and pan blur associated with a video. In such a case, pan blur exception weight may not be required as a separate metric.

In an aspect, the CPU 202 may be configured to refer to the filtered current image generated for analog noise determination. Further, the CPU 202 may be configured to utilize the edge image determined for analog noise in order to determine gradients for generation of the gradient magnitude image based on execution of one or more instructions of the edge detection module 208a. The CPU 202 may be further configured to determine a direction of the extracted gradients of the filtered current image, based on execution of one or more instructions of the edge detection module 208b. The CPU 202 may be configured to determine a gradient angle image based on the determined directions of the extracted gradients. In an example embodiment, the electronic device 104 may further utilise the boundary neighbourhood image determined in the case of analog noise calculation. Based on the gradient angle image and the boundary neighbourhood image for analog noise determination, the CPU 202 may be configured to determine raw noise angle image based on execution of one or more instructions of the raw noise angle image generation module 224, by the CPU 202. The CPU 202 may be further configured to perform 2-dimensional Fast Fourier Transform (2D-FFT) of the determined raw noise angle image. Such a 2D-FFT may be performed in order to determine one or more frequency components of the raw noise angle image to generate transformed noise angle image. Further, the 2D-FFT based one or more one or more frequency components of the raw noise angle image may be determined based on execution of one or more instructions of the 2D-FFT module 226, by the CPU 202. The CPU 202 may be further configured to normalize the frequency components of the transformed noise angle image based on the frequency component whose magnitude is the highest. The CPU 202 may be further configured to scale the normalized frequency components of the transformed noise image based on a predefined constant. The normalization and the scaling of the frequency components of the transformed noise angle image may be based on execution of one or more instructions of the FFT bin normalization module 228, by the CPU 202.

In an aspect, the CPU 202 may be configured to determine a grid periodicity and an offset in horizontal and vertical direction for the gradient magnitude image. Such a determined grid periodicity and the offset may correspond to the blockiness artefacts present in the one or more images of the current image of the received video. The determination of the grid periodicity and the offset may be based on execution of one or more instructions of the block grid analysis module 230, by the CPU 202.

In an aspect, the CPU 202 may be configured to determine a high frequency noise value by aggregation of the scaled frequency components that are above a high frequency noise threshold and below a predefined constant. Further, the determination of the high frequency noise may be based on scaled frequency components that are outside a block grid based on the determined grid periodicity and the offset in horizontal and vertical direction for filtered current image. Additionally, the determination of the high frequency noise may be further based on high frequency components that are within first and second harmonic of a grid pattern.

FIGS. 3A to 3D illustrate a flow diagram for implementation of a system for detection of artefacts comprising analog noise and high frequency noise in a video, according to an embodiment. FIGS. 3A to 3D comprise a flowchart 300 that is explained in conjunction with the elements disclosed in FIGS. 1 and 2.

The flowchart of FIG. 3 shows the architecture, functionality, and operation for detection of artefacts comprising analog noise and high frequency noise in a video. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 3 may in fact be executed substantially concurrently or the blocks may sometimes be executed in the reverse order, depending upon the functionality involved. Any process descriptions or blocks in flowcharts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine. The flowchart starts at the step 302 and proceeds to step 304.

Figure 3A:
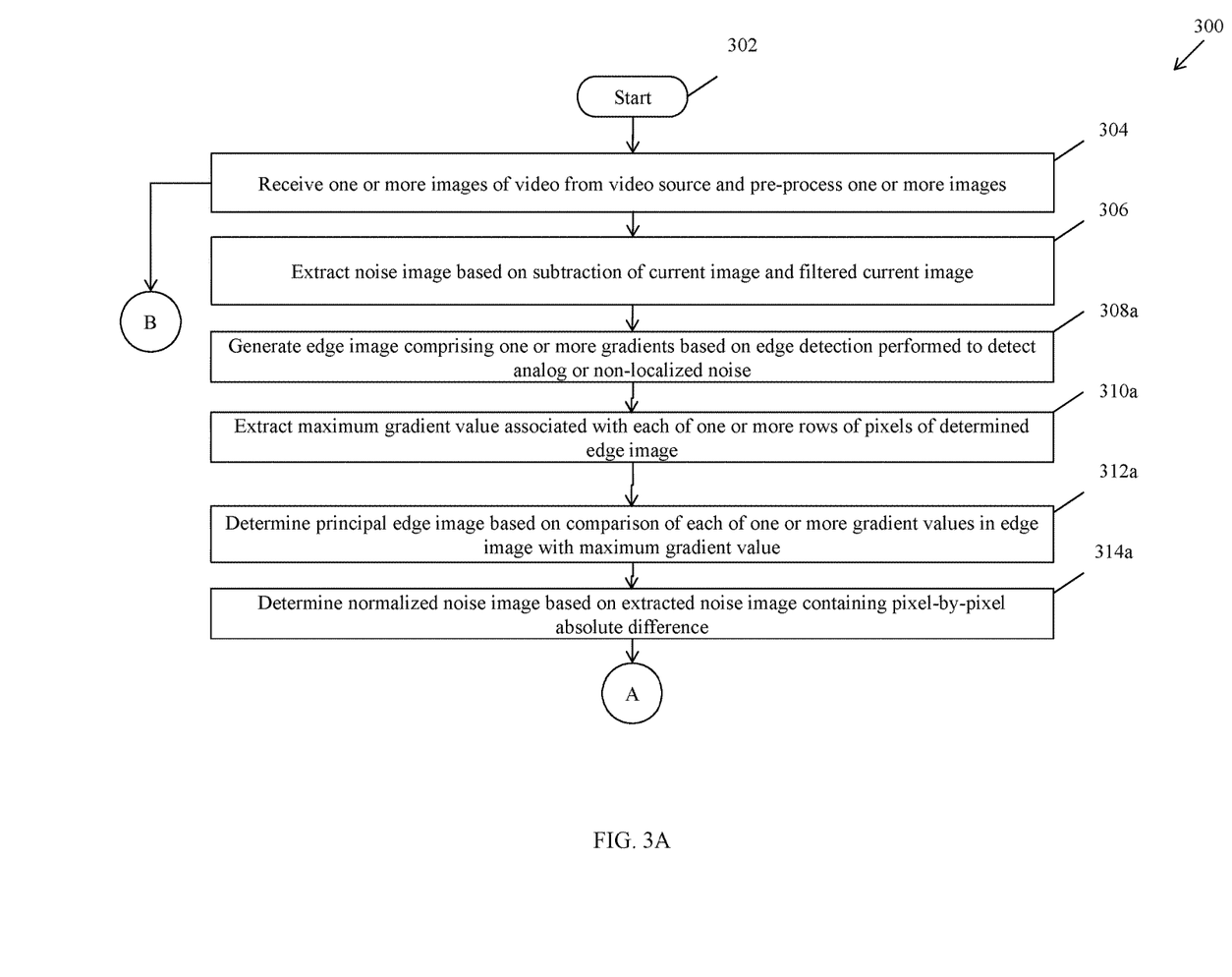
FIGS. 3A to 3D illustrate a flow diagram for implementation of a system for detection of artefacts comprising analog noise and high frequency noise in a video, according to an embodiment.

At step 304, the one or more images of the video received from the video source 102 may be pre-processed, by the CPU 202, for reduction of speckled and/or shot noise. Such a pre-processing is performed by the CPU 202, based on execution of one or more instructions of the median filtering module 206. In an example embodiment, the pre-processing may be based on an image processing technique, such as median filtering. In an example embodiment, based on the one or more instructions of the median filtering module 206, the CPU 202 may be configured to isolate a "noise pixel" in the input image that may be surrounded by a "normal pixel" in the vicinity of the "noise pixel". The "noise pixel" corresponds to a pixel value that may not be in consonance with one or more pixels in the vicinity. Therefore, a nearest-neighborhood (NN) analysis may performed by constructing an "N×N" window (where "N" is typically odd). The window is moved over the "Y" (luminance component) image, one pixel location at a time horizontally, beginning from the upper left hand corner of the input image, all the way to the lower right hand corner, in a raster fashion. At each location the center of the "N×N" window may be the reference pixel that is analyzed for noise. The contents of the "N×N" pixels captured within the window may be ranked from a lowest to a highest in a linear array of length N*N. Subsequently, the reference pixel value may be replaced by the value in median location of the linear array, such as location (N*N−1)/2. Thus, if the reference pixel is noisy, then it would be ranked very high in the linear array and thus would be far away or isolated from the median location. This step generates a "filtered_image_array".

At step 306, a noise image may be extracted by the CPU 202 based on the subtraction of the current image (of the one or more images of the received video) from the filtered current image, "filtered_image_array". Such an extraction may be further based on a pixel-by-pixel absolute difference of the current image and the filtered current image.

At step 308a, for detection of analog or non-localized noise in a video, edge detection may be performed by the CPU 202 to generate an edge image comprising of one or more gradients. The edge detection may be performed based on execution of one or more instructions of the edge detection module 208a by the CPU 202. The one or more instructions may be based on one or more edge detection techniques (known in the art), such as a Sobel operator, a first order difference, Canny edge detection, or the like.

In an aspect, the Sobel operator based technique, may be based on Sobel masks, such as "sobel_mask_h" and "sobel_mask_v" that may be correspond to a "3×3 matrix" in accordance with equations (1) and (2):

$$\text{sobel\_mask\_h} = \begin{bmatrix} -1 & 0 & 1 \\ -2 & 0 & 2 \\ -1 & 0 & 1 \end{bmatrix} \quad (1)$$

$$\text{sobel\_mask\_v} = \begin{bmatrix} 1 & 2 & 1 \\ 0 & 0 & 0 \\ -1 & -2 & -1 \end{bmatrix} \quad (2)$$

In an aspect, the first order difference based technique may be used. The first order difference may be based on masks, such as "first_diff_h" and "first_diff_v" that may be in accordance with equations (3) and (4):

$$\text{first\_diff\_}h = [-1\ 1] \quad (3)$$

$$\text{first\_diff\_v} = \begin{bmatrix} -1 \\ 1 \end{bmatrix} \quad (4)$$

At step 310a, a maximum gradient value associated with each of the one or more rows of pixels of the determined edge image may be extracted, by the CPU 202. The determined maximum gradient value corresponds to a predefined programmable percentage of maximum gradient magnitude value for each row in the edge image. The extraction of the gradient value by the CPU 202 may be based on the execution of one or more instructions of the dynamic thresholding module 212.

In an aspect, a max gradient "max_grad" for each row may be obtained by the CPU 202 by use of the pair of horizontal and vertical gradient values "{grad_x, grad_y}". Further, the maximum value obtained for each row of the edge image may be used to implement a gradient value "BOUNDARY_CORE[x]" for that row, where "x" is the row index. In an aspect, a proportion of the "max_grad" may be used to generate the gradient value "BOUNDARY_CORE[x]" in accordance with equation (5):

$$\text{BOUNDARY\_CORE}[x] = B\_SCALE*(\text{max\_grad}/EB\_K1) \quad (5)$$

where, "EB_K1" is the programmable factor used earlier and "B_SCALE" is the scaling factor that may correspond to a programmable parameter that may further corresponds to the set of predefined constants stored in the memory 204. The aforementioned BOUNDARY_CORE[x] now corresponds to Principal Gradient Threshold. A person of ordinary skill in the art will appreciate that the predefined constant "EB_K1" and the scaling factor "B_SCALE" may be stored in the memory 204 or provided by the user in real-time, without limiting the scope of the disclosure. At step 312a, a PE image may be determined based on a comparison of each of the one or more gradient in the edge image, with the maximum gradient value of the row. For example, the overall gradient magnitude "grad_mag[x][y]" for a row index "x" and column index "y", may be compared with the gradient value "BOUNDARY_CORE[x]". In instances, when the value of the overall gradient magnitude "grad_mag[x][y]" exceeds the gradient value "BOUNDARY_CORE[x]", corresponding element in the array "boundary_image_array[x][y]" having row index "x" and column index "y" is updated with the overall gradient magnitude "grad_mag[x][y]". Such gradients exceeding the gradient value correspond to a set of gradients. In instances, when the value of the overall gradient magnitude "grad_mag[x][y]" is less than the gradient value "BOUNDARY_CORE[x]", corresponding element in the array "boundary_image_array[x][y]" having row index "x" and column index "y" is updated with a value "0". The array "boundary_image_array" corresponds to the PE image.

At step 314a, a normalized noise image may be determined by the CPU 202 based on extracted noise image that comprises the pixel-by-pixel absolute difference determined in step 306. In an aspect, the CPU 202 may be configured to determine a maximum value of the aforementioned absolute difference. The CPU 202 may be further configured to normalize the noise image based on the determined maximum value of the absolute difference. Such a normalization of the noise image renders the analysis insensitive to the overall intensity of the image and hence makes enables predefined programmable thresholding (such as "EB_AN_NOISE_THR") to core out spurious gradients. In an example embodiment, the normalized noise image may be represented by "norm_noise_image_array". Further, the determination of the normalized noise image may be based on execution of one or more instructions of the noise image pixel normalization module 210.

At step 316a, a boundary neighbourhood image, "boundary_image_array" that corresponds to principal edge image may be determined by the CPU 202. The analog noise is to be determined within these set of boundary. Such a determination may be based on execution of one or more instructions of the boundary neighborhood generation module 214. In order to determine the boundary neighbourhood image, the CPU 202 may be configured to retrieve the programmable parameters, such as "BOUNDARY_NHBD_LEN_N" and/or "BOUNDARY_NHBD_LEN_N+1" from the memory 204. In an aspect, the determination of the boundary neighbourhood image may be based on processing the "boundary_image_array" in a raster fashion wherein the pixels of the "boundary_image_array" are processed from the upper left hand corner (top row of the pixels) to the lower right hand corner (bottom row of the pixels) convexity. In an example embodiment, the boundary neighborhood image may be represented by "boundary_nhbd_image_array". The CPU 202 may be configured to determine whether a pixel at a location "(x, y)" corresponds to a pixel of the principal edge image. Further, using the programmable parameters, such as "BOUNDARY_NHBD_LEN_N" and "BOUNDARY_NHBD_LEN_N+1" that may be stored in the memory 204, the CPU 202 may be configured to check whether a pixel at a location "(x, y)" of the "boundary_image_array", corresponds to the boundary pixels in the immediate vicinity of the principal edge. For each pixel in the immediate vicinity of the principal edge, the CPU 202 may be configured to check whether a pixel corresponds to the boundary pixels of the boundary edges. In instances, when the pixels corresponds to boundary pixels, the CPU 202 may be configured to update the pixels at the location "(x, y)" of the near boundary neighborhood image "boundary_nhbd_image_array" with a value "1".

At step 318a, a raw noise image may be determined by the CPU 202 based on the principal edge image, boundary neighborhood image and the normalized noise image. Such a determination of the raw noise image comprises exclusion of pixels of the normalized noise image corresponding to which the gradients are present in the PE image and the boundary neighbourhood image. Such exclusion may be based on a first condition that may comprise determining whether the pixel at the location "(x, y)" corresponds to a region around the boundary of the principal edge. In other words, it may be determined that the aforementioned pixels do not correspond to the pixels of the boundary neighbourhood image having value "1". This is in accordance with the equation (6):

$$\text{boundary\_nhbd\_image\_array}[x][y] \ne 1 \quad (6)$$

In an embodiment, the determination of the raw noise image may be based on execution of one or more instructions of the raw noise image generation module 216. In an example embodiment, the raw noise image may be represented by "raw_noise_image_array.

Figure 3B:
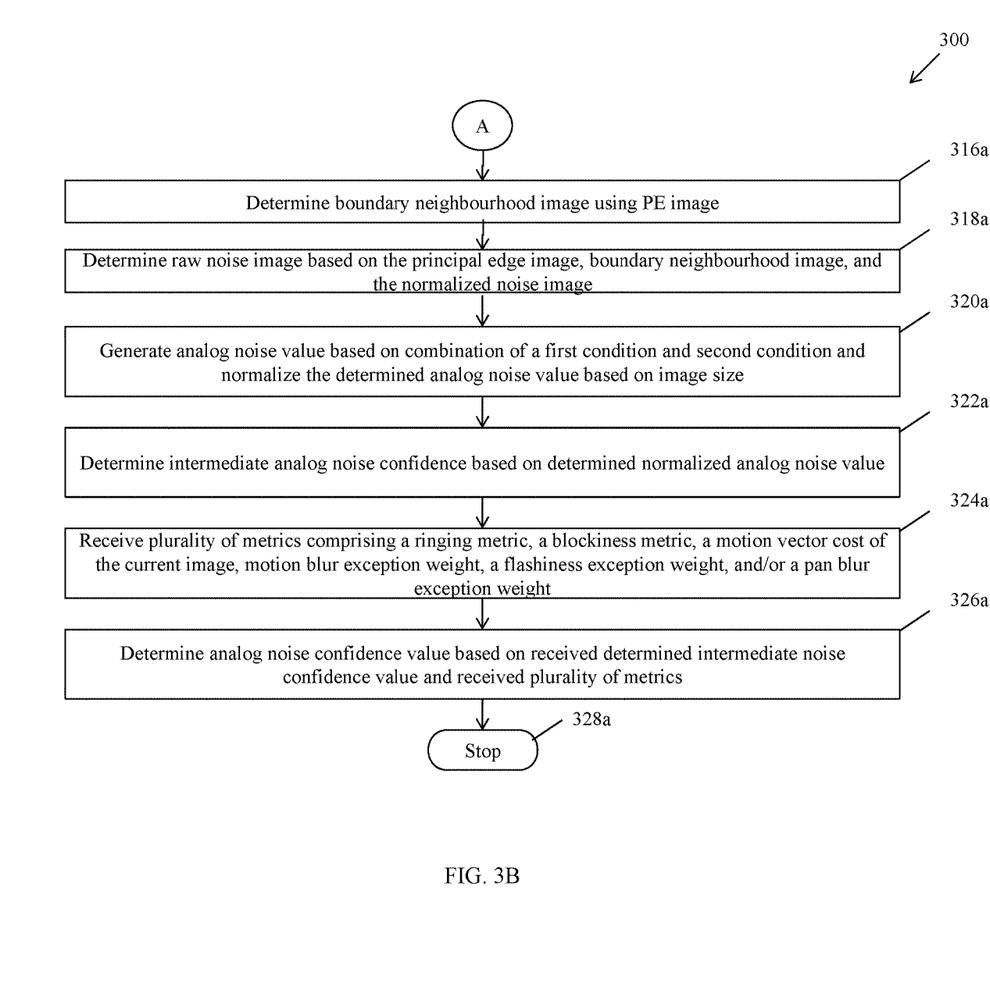

At step 320a, an analog noise value may be determined by the CPU 202 based on combination of a first condition and second condition. In an example embodiment, the second condition may comprise determining whether the pixels present in the raw noise image having value less than an analog noise threshold, in accordance with equation (7):

$$\text{raw\_noise\_image\_array}[x][y] \text{EB\_AN\_NOISE}\_THR \quad (7)$$

where, "raw_noise_image_array[x][y]" corresponds to the pixel of the raw noise image at a location "(x, y)", and "EB_AN_NOISE_THR" corresponds to analog noise threshold that may be stored in the memory 204.

Based on the aforementioned first condition and the second condition, the CPU 202 may be configured to update a counter "analog_noise_energy" (indicative of analog noise value) with the raw noise image pixel, in accordance with the equation (8):

analog_noise_energy=analog_noise_energy+raw_noise_image_array[x][y]  (8)

In an aspect, the determined analog noise value may be normalized by the CPU 202 based on the height "h" and width "w" of the image, in accordance with the equation (9):

analog_noise_energy=analog_noise_energy/(h*w)  (9)

At step 322a, an intermediate analog noise confidence may be determined by the CPU 202 based on the execution of the intermediate analog noise metric generation module 220a. In an aspect, the determination of the intermediate analog noise confidence may be based on the determined normalized analog noise value (explained in equation (9)) and programmable constants "EB_K22" and "EB_K23" that may be stored in the memory 204. In an example embodiment, the value of the programmable constant "EB_K22" may be negative whereas the value of the programmable constant "EB_K23" may be positive. The determination of the intermediate analog noise confidence may be in accordance with the equation (10):

intermediate_analog_noise_confidence=1−exp$(EB\_K22*analog\_noise\_energy^{EB\_K23})$  (10)

At step 324a, a plurality of metrics pertaining to temporal and/or compression artefacts that may be introduced in the images of the video received from the video source 102, may be retrieved by the CPU 202 from the memory 204. Such plurality of metrics may be required in order to avoid the false positives in analog noise detection due to regions with a lot of spatial detail. Furthermore, based on such plurality of metrics, an inter picture (frame/field) motion compensated sum of absolute difference (SAD) cost obtained for a change of scene and/or an analysis of boundary of a shot analysis may be considered by the CPU 202. The SAD cost is considered as a measure of the temporal discontinuity between a current patch of the image and a previous patch.

In an example embodiment, such plurality of metrics may be received form a system that is external to the CPU 202. In an example embodiment, such metrics may include, but are not limited to, a ringing metric, a blockiness metric, a motion vector cost of the current image, blurriness exception weight, a flashiness exception weight, and/or a pan blur exception weight. In an example embodiment, the blurriness exception weight may correspond to a metric that is based on the blurriness and pan blur associated with a video. In such a case, pan blur exception weight may not be required as a separate metric. A person of ordinary skill in the art is informed that the aforementioned metrics have been referenced from the U.S. Pat. No. 9,232,118 "Method and System for detection of video artefacts" and U.S. application Ser. No. 15/075,079 "Method and System for detection of blur artefact in digital video due to high quantization".

At step 326a, an analog noise confidence value may be determined by the CPU 202 based on the determined intermediate analog noise confidence value and the aforementioned plurality of metrics. In an aspect, the plurality of metrics may be used as a weighting function for determining analog noise confidence value. Such a determination of the analog noise confidence value may be based on the execution of one or more instructions of the analog noise confidence generation module 222.

In an aspect, for determining analog noise confidence value, the CPU 202 may be configured to determine whether fade-in is present in the images of the received video from the video source 102. Such a determination may be performed by checking whether the value of the SAD cost of the previous frames is non-zero. In scenarios, when the no fade-in exists, a motion blur based damping factor may be generated based on gradient histogram entropy ("grad_entropy") disclosed in the referenced application U.S. Pat. No. 9,232,118, in accordance with the equation (11):

sum_of_ent_del_exp=CONSTANT_1*$EB\_K44$*grad_entropy*grad_entropy  (11)

where, "CONSTANT_1" and "EB_K44" correspond to programmable parameters that may be stored in the memory 204, "sum_of_ent_del_exp" corresponds to motion blur based damping factor. The determination of the analog noise confidence value may be based on the combined effect of the plurality of metrics, in accordance with the equation (12):

analog_noise_confidence=intermediate_analog_noise_confidence*(1−exp($EB\_K24$*(current SAD cost/$EB\_K26)^{EB\_K25}$)))*($e^{(EB\_K45*skewness)}$)*(1−blockiness_confidence)*(1−ringing_confidence$^{EB\_K46}$)*(1−$e^{(sum\_of\_ent\_del\_exp)}$)*(exp($EB\_K24$*(pan_detect_$cnt/EB\_K47)^{EB\_K25}$)))  (12)

where, "skewness" corresponds to flashiness exception weight for flash compensation, "blockiness confidence" corresponds to the blockiness metric for blockiness compensation due to high quantization parameter, "ringing confidence" corresponds to the ringing metric for ringing artefact compensation, "sum_of_ent_del_exp" corresponds to motion blur based damping factor, "pan_detect_cnt" corresponds to camera panning for camera an compensation, "EB_K24", "EB_K25", "EB_K26", and "EB_K47" are programmable parameters that may be stored in the memory 204. Further, in an aspect, the programmable parameters "EB_K24" and "EB_K47" are less than zero. In instances, when the CPU 202 determines that the fade-in is present based on equation (14), the analog noise confidence value is set to zero by the CPU 202. The control passes to end step 328a.

Figure 3C:
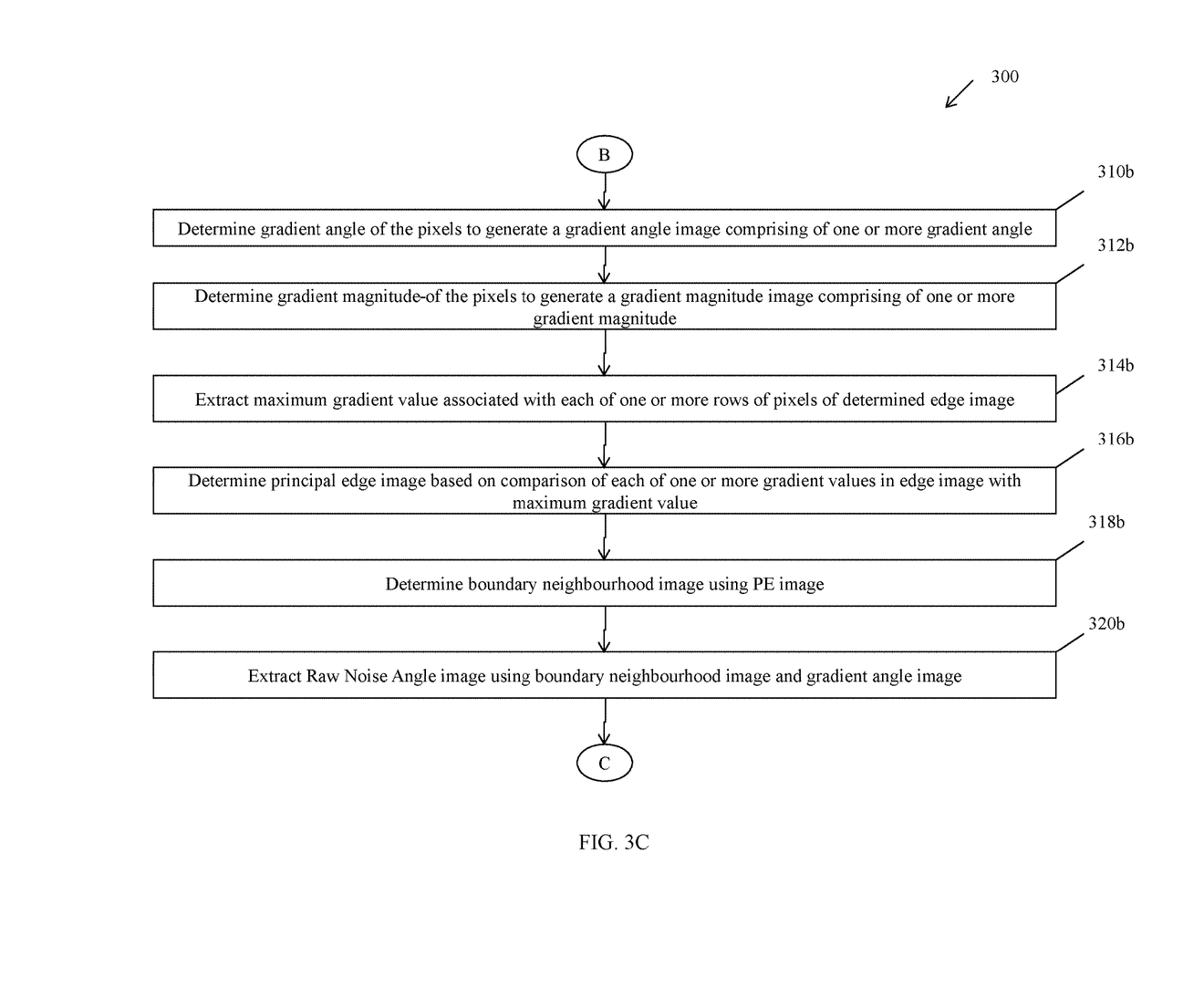

At step 310b, for detection of high frequency noise in a video, gradient angle of the pixels may be determined by the CPU 202 to generate a gradient angle image comprising of one or more gradient angles. The gradient angles may be calculated on the basis of sign of the gradient values. Such a determination of the gradient sign change may comprise determining whether the gradient of a pixel at a location "(x, y)" is greater than zero or less than zero. In an instance, when the gradient is less than zero, the value corresponding to the pixel at the location "(x, y)" in a "raw_noise_angle_array" is updated to a constant value, such as "120". In an instance, when the gradient is greater than zero, the value corresponding to the pixel at the location "(x, y)" in a "raw_noise_angle_array" is update to a constant value, such as "240". The "raw_noise_angle_array" represents the sign change of the gradient of the pixels of the edge image.

At step 312b, gradient magnitude of the pixels may be determined by the CPU 202 to generate a gradient magnitude image comprising of one or more gradient magnitudes. The gradient magnitude determination may be performed based on execution of one or more instructions of the edge detection module 208a by the CPU 202.

The one or more instructions of the edge detection module 208a and 208b may be based on one or more edge detection techniques (known in the art), such as a Sobel operator, a first order difference, Canny edge detection, or the like. Further, Based on the masking of the "filtered_image_array" by use of the Sobel mask "sobel_mask_h" in a raster fashion, a horizontal gradient profile may be generated. Similarly, based on the masking of the "filtered_image_array" by use of the Sobel mask "sobel_mask_v" in a raster fashion, a vertical gradient profile may be generated. At each location a pair of horizontal and vertical gradient values "{grad_x, grad_y}", respectively, may be used to generate an overall gradient magnitude "grad_mag", in accordance with the equation (13):

$$\text{grad\_mag} = \sqrt{(\text{grad\_x})^2 + (\text{grad\_y})^2} \tag{13}$$

At step 314b, a maximum gradient value associated with each of one or more rows of pixels of determined edge image may be determined by the CPU 202 based on execution of one or more instructions of the dynamic thresholding module 212. At step 316b, a PE image may be determined by the CPU 202 based on comparison of each of one or more gradient values in edge image with maximum gradient value. At step 318b, a boundary neighbourhood image may be determined by the CPU 202 based on the determined PE image. A person of ordinary skill in the art will appreciate that the determination of the PE image and the boundary neighbourhood image by the CPU 202 at steps 316b and 318b may be performed in a manner similar to determination of the PE image and the boundary neighbourhood image, as explained previously.

At step 320b, a raw noise angle image may be extracted based on the determined boundary neighbourhood image and the gradient angle image. Such an image may be extracted based on the determined gradient angle "grad_ang". The CPU 202 may be configured to exclude gradients corresponding to boundary neighbourhood image "boundary_nhbd_image_array" generated by the boundary neighbourhood generation module 214 from "grad_ang" for generation of raw noise angle image "raw_noise_angle_array", as explained in step 320b. In an example embodiment, the determination of the raw noise angle image may be based on execution of one or more instructions of the raw noise angle image generation module 224.

At step 322b, a grid periodicity and an offset of a block grid in the gradient magnitude image may be determined by the CPU 202, based on execution of one or more instructions of the block grid analysis module 230. In an aspect, the periodicity and offset may be obtained for a horizontal and a vertical direction of the edge image based on processing of the horizontal and vertical gradients, respectively. A horizontal grid periodicity "h_block_period" may be determined based on a horizontal grid analysis and a vertical grid periodicity "v_block_period" may be determined based on a vertical grid analysis. The one or more instructions of the block grid analysis module 230 may be based on a block grid analysis technique disclosed by Qadri. M. T., Tan. K. T. & Ghanbari M, "Frequency Domain Blockiness and Blurriness Meter for Image Quality Assessment", International Journal of Image Processing (IJIP), Volume (5): Issue (3): 2011.

Figure 3D:
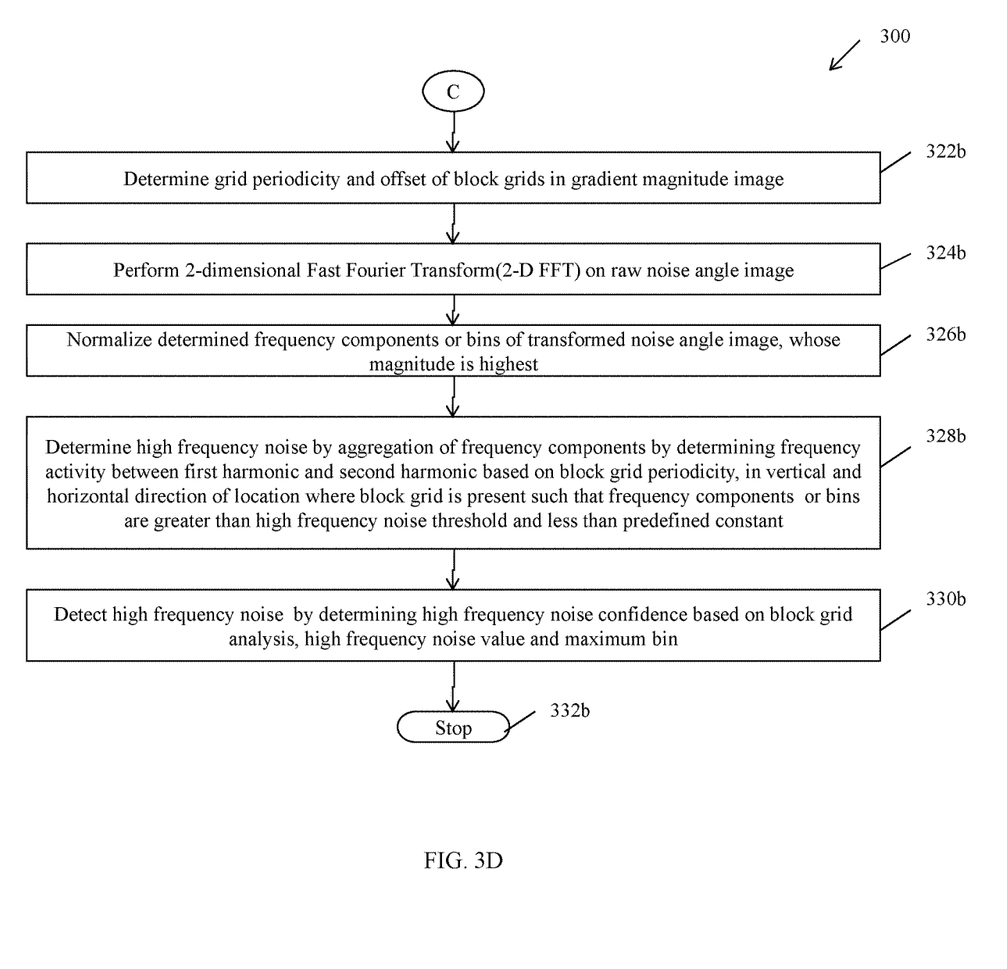

At step 324b, one or more frequency components of the raw noise angle image may be determined by the CPU 202, by performing a two-dimensional Fast Fourier Transform (2D-FFT) of the raw noise angle image to generate transformed_noise_angle_array. Further, the one or more frequency components of the raw noise angle image "raw_noise_angle_array" may be analyzed by the CPU 202 to detect high frequency noise, based on the 2D-FFT. In an example embodiment, the aforementioned 2D-FFT may be performed by the CPU 202 based on execution of one or more instructions of the 2-dimensional Fast Fourier Transform (2D-FFT) module 226.

At step 326b, the frequency components or bins obtained from step 324b may be normalized with respect to a maximum bin, represented by "max_bin". In an example embodiment, the maximum bin may correspond to the average of the "transformed_noise_angle_array" or the "(0, 0)" frequency bin of its 2D-FFT. In an aspect, the normalized bins may be scaled on a scale of an exemplary predefined constant, such as "240" so that all of the bins henceforth are present within the interval "[0, 240]". Further, the maximum bin gets mapped to the exemplary predefined constant "240". In an example embodiment, the aforementioned 2D-FFT may be performed by the CPU 202 based on execution of one or more instructions of the FFT bin normalization module 228.

At step 328b, a high frequency noise may be determined by the CPU 202 by aggregation of the frequency components or bins. Such an aggregation may be performed for a block grid by determining frequency activity between a first harmonic and a second harmonic based on the block grid periodicity, in a vertical and a horizontal direction of the location where a block grid is present. Further, the aggregation may be performed based on comparison of frequency components with a programmable high frequency noise threshold "EB_HF_NOISE_THR", and the aforementioned exemplary predefined constant "240".

In an example embodiment, the frequency component or bin may be represented by "transformed_noise_angle_array [i][j]", where "i" corresponds to the height "h" of the image and "j" corresponds to the width "w" of the image. In an aspect, the CPU 202 may initialise the high frequency noise value represented by "hf_noise_value", to zero. The CPU 202 may be further configured to process each row and column of the image in order to determine activity between the first harmonic and the second harmonic based on the block grid periodicity which is the inverse of the block period (1/block_period). Further, such an operation may be performed by the CPU 202 in the vertical and horizontal direction. In an aspect, the CPU 202 may be configured to update the value of the high frequency noise based on comparison of the frequency component or bin at a location "(x, y)" with the programmable high frequency noise threshold "EB_HF_NOISE_THR", and the aforementioned exemplary predefined constant "240", well as the condition when the frequency component or bin at the location "(x, y)" is present between the first harmonic and the second harmonic and does not correspond to the block grid. Such an update is performed in accordance with the conditions (14) and (15), both of which, if true, invoke equation (16):

$$\text{if ((transformed\_noise\_angle\_array}[x][y] > EB\_HF\_NOISE\_THR) \text{ and (transformed\_noise\_angle\_array}[x][y] < 240)) \tag{14}$$

$$\text{if ((}x,y\text{) is not on the block grid) and ((}x,y\text{) is within the 1st and 2nd harmonic of the grid pattern))} \tag{15}$$

$$\text{hf\_noise\_value} = \text{hf\_noise\_value} + \text{transformed\_noise\_angle\_array}[x][y] \tag{16}$$

At step 330b, the high frequency noise is detected based on determining a high frequency noise confidence value that may be based on block grid analysis, high frequency noise value, and the maximum bin (max_bin), by the CPU 202. In an aspect, the high frequency noise confidence value is based on the high frequency noise value, and the frequency component with the highest magnitude (maximum bin or "max_bin"), in accordance with the equation (17):

$$HF\_\text{noise\_confidence} = (1 - e^{(EB\_K20 * hf\_noise\_value)}) * (1 - e^{(EB\_K27 * max\_bin)}) \tag{17}$$

where, "EB_K20" and "EB_K27" correspond to programmable parameters. In an example embodiment, the programmable parameters "EB_K20" and "EB_K27" may be stored in the memory 204. Further, the aforementioned detection of the high frequency noise based on high frequency noise confidence value may be performed by the CPU 202 based on execution of one or more instructions of the high frequency noise confidence generation module 232. The control passes to end step 332b.

In an example embodiment, the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps for detection of analog or non-localized noise in a video having one or more images. The one or more processors upon executing the instructions may be configured to extract a noise image by subtracting a current image from a filtered current image; determine a maximum pixel value from the noise image; determine a normalized noise image containing by and normalizing all the pixels present in the noise image with respect to the maximum pixel value; extract a raw edge image by extracting gradients of the current image; determine a maximum gradient magnitude for each row of the raw edge image; determine a principal edge image containing gradients for each row that are greater than a predefined percentage of the maximum gradient magnitude for that row; generating a boundary neighbourhood image using the determined principal edge image; determine a raw noise image by using the principal edge image, boundary neighbourhood image, and the normalized noise image and excluding pixels of the normalized noise image corresponding to which the gradients are present in the PE image and the boundary neighbourhood image; determine an analog noise value by determining an aggregate of all the pixel values corresponding to the pixels present in the raw noise image that are below an analog noise threshold and normalizing the aggregate by the size of the raw noise image; determine an intermediate noise confidence value based on the analog noise value; and detect analog noise based on determining an analog noise confidence value, the analog noise confidence value is based on at least the intermediate noise confidence value, a ringing metric, a blockiness metric, a motion vector cost of the current image, a blurriness exception weight, a flashiness exception weight, and a pan blur exception weight.

Other example embodiment of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps for detection of high frequency noise in a video having one or more images. The one or more processors upon executing the instructions may be configured to determining a filtered current image based on applying median filtering on the current image; extract a raw edge image by extracting gradients of the filtered current image and determining a grid periodicity and an offset in horizontal and vertical direction for the edge image; determine a maximum absolute gradient magnitude for each row of the edge image; determine a principal edge image containing gradients for each row that are greater than a predefined percentage of the maximum gradient magnitude for that row; generate a boundary neighbourhood image using the determined principal edge image; determine a gradient angle image using sign change for each pixel of the raw edge image; determine a raw noise angle image by utilizing at least the gradient angle image and the boundary neighbourhood image, for each pixel; determine one or more frequency components of the raw noise angle image by performing a two-dimensional Fast Fourier transform of the raw noise angle image; normalize the frequency components of the transformed noise angle image based on the frequency component whose magnitude is the highest; scale the normalized frequency components of the transformed noise image by a predefined constant; determine a high frequency noise value by aggregating the frequency components that are above a high frequency noise threshold and below the predefined constant, and outside a block grid based on the grid periodicity and the offset in horizontal and vertical direction for the edge image, and within first and second harmonic of a grid pattern; and detect high frequency noise based on determining a high frequency noise confidence value, the high frequency noise confidence value is based on the high frequency noise value, and the frequency component with the highest magnitude.

Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e. g., a modem or network connection).

Moreover, although the present disclosure and its advantages have been described in detail, it should be understood that various changes, substitutions and alterations can be made herein without departing from the disclosure as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for detection of analog or non-localized noise in a video having one or more images, the method comprising the steps of:

extracting a noise image by subtracting a current image from a filtered current image;

determining a maximum pixel value from the noise image;

determining a normalized noise image by normalizing all the pixels present in the noise image with respect to the maximum pixel value;

extracting an edge image by extracting gradients of the filtered current image;

determining a maximum absolute gradient magnitude for each row of the edge image;

determining a principal edge image containing gradients for each row that are greater than a predefined percentage of the maximum gradient magnitude for that row;

generating a boundary neighbourhood image using the determined principal edge image;

determining a raw noise image by using the principal edge image, the boundary neighbourhood image, and the normalized noise image and excluding the pixels of the normalized noise image corresponding to which the gradients are present in the PE image and the boundary neighbourhood image;

determining an analog noise value by determining an aggregate of all the pixel values corresponding to the pixels present in the raw noise image that are below an analog noise threshold and normalizing the aggregate by the size of the raw noise image;

determining an intermediate noise confidence value based on the analog noise value; and detecting analog noise based on determining an analog noise confidence value, the analog noise confidence value is based on at least the intermediate noise confidence value, a ringing metric, a blockiness metric, a motion vector cost of the current image, a blurriness exception weight, a flashiness exception weight, and a pan blur exception weight.

2. The method of claim 1, wherein the filtered current image is obtained by applying a median filter to the current image.

3. The method of claim 1, wherein the edge image is extracted by applying a filter to the current image, wherein the filter is selected from a group consisting of a Sobel filter, a First Order Difference gradient filter, and a Canny edge detector.

4. A non-transient computer-readable medium comprising instructions for causing a programmable processor to:

extract a noise image by subtracting a current image from a filtered current image;

determine a maximum pixel value from the noise image;

determine a normalized noise image containing by and normalizing all the pixels present in the noise image with respect to the maximum pixel value;

extract a raw edge image by extracting gradients of the current image;

determine a maximum gradient magnitude for each row of the raw edge image;

determine a principal edge image containing gradients for each row that are greater than a predefined percentage of the maximum gradient magnitude for that row;

generate a boundary neighbourhood image using the determined principal edge image;

determine a raw noise image by using the principal edge image, boundary neighbourhood image, and the normalized noise image and excluding the pixels of the normalized noise image corresponding to which the gradients are present in the PE image and the boundary neighbourhood image;

determine an analog noise value by determining an aggregate of all the pixel values corresponding to the pixels present in the raw noise image that are below an analog noise threshold and normalizing the aggregate by the size of the raw noise image;

determine an intermediate noise confidence value based on the analog noise value; and detect analog noise based on determining an analog noise confidence value, the analog noise confidence value is based on at least the intermediate noise confidence value, a ringing metric, a blockiness metric, a motion vector cost of the current image, a blurriness exception weight, a flashiness exception weight, and a pan blur exception weight.

5. A method for detection of high frequency noise in a video having one or more images, the method comprising the steps of:

determining a filtered current image based on applying median filtering on the current image;

extracting an edge image by extracting gradients of the filtered current image and determining a grid periodicity and an offset in horizontal and vertical direction for a filtered current image;

determining a maximum absolute gradient magnitude for each row of the edge image;

determining a principal edge image containing gradients for each row that are greater than a predefined percentage of the maximum gradient magnitude for that row;

generating a boundary neighbourhood image using the determined principal edge image;

determining a gradient angle image using sign of gradient values for each pixel of the edge image;

determining a raw noise angle image by utilizing at least the gradient angle image and the boundary neighbourhood image, for each pixel;

determining a transformed noise angle image by performing a two-dimensional Fast Fourier transform of the raw noise angle image;

normalizing the frequency components of the transformed noise angle image based on the frequency component whose magnitude is the highest;

scaling the normalized frequency components of the transformed noise angle image by a predefined constant;

determining a high frequency noise value by aggregating the magnitude corresponding to frequency components that have magnitudes above a high frequency noise threshold and below the predefined constant, and corresponding to frequencies other than the frequencies corresponding to block grid based on the grid periodicity and the offset in horizontal and vertical direction for the edge image, and within first and second harmonic of a grid pattern; and detecting high frequency noise based on determining a high frequency noise confidence value, the high frequency noise confidence value is based on the high frequency noise value, and the frequency component with the highest magnitude.

6. A non-transient computer-readable medium comprising instructions for causing a programmable processor to:

determining a filtered current image based on applying median filtering on the current image;

extract a raw edge image by extracting gradients of the filtered current image and determining a grid periodicity and an offset in horizontal and vertical direction for the edge image;

determine a maximum absolute gradient magnitude for each row of the edge image;

determine a principal edge image containing gradients for each row that are greater than a predefined percentage of the maximum gradient magnitude for that row;

generate a boundary neighbourhood image using the determined principal edge image;

determine a gradient angle image using sign change for each pixel of the raw edge image;

determine a raw noise angle image by utilizing at least the gradient angle image and the boundary neighbourhood image, for each pixel;

determine one or more frequency components of the raw noise angle image by performing a two-dimensional Fast Fourier transform of the raw noise angle image;

normalize the frequency components of the transformed noise angle image based on a frequency component whose magnitude is highest;

scale the normalized frequency components of the transformed noise image by a predefined constant;

determine a high frequency noise value by aggregating the frequency components that are above a high frequency noise threshold and below the predefined constant, and outside a block grid based on the grid periodicity and the offset in horizontal and vertical direction for the edge image, and within first and second harmonic of a grid pattern; and detect high frequency noise based on determining a high frequency noise confidence value, the high frequency noise confidence value is based on the high frequency noise value, and the frequency component with the highest magnitude.

* * * * *